(12) United States Patent
Kirsten et al.

(10) Patent No.: US 7,836,406 B1
(45) Date of Patent: Nov. 16, 2010

(54) METHOD AND APPARATUS FOR DISPLAYING A USER INTERFACE ENABLING SELECTION AND INSTANT DISPLAY AND ACCESS OF PAGES

(75) Inventors: Howard S. Kirsten, Wellesley, MA (US); Phillip J. Ohme, San Diego, CA (US); Kathy Ann Kirkendall, La Jolla, CA (US); Douglas W. Demoro, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 283 days.

(21) Appl. No.: 11/313,278

(22) Filed: Dec. 19, 2005

(51) Int. Cl.
*G06F 3/00* (2006.01)

(52) U.S. Cl. ............ 715/777; 705/31; 705/19; 715/769; 715/776

(58) Field of Classification Search ............ 715/777, 715/786, 764, 765, 769, 821, 780; 705/64, 705/42, 34
See application file for complete search history.

(56) References Cited

U.S. PATENT DOCUMENTS

| | | | | |
|---|---|---|---|---|
| 5,515,497 A * | 5/1996 | Itri et al. | | 715/776 |
| 5,745,716 A * | 4/1998 | Tchao et al. | | 715/777 |
| 5,870,092 A * | 2/1999 | Bedford-Roberts | | 715/777 |
| 6,002,398 A * | 12/1999 | Wilson | | 715/777 |
| 6,037,941 A * | 3/2000 | Goto | | 715/777 |
| 6,282,551 B1 * | 8/2001 | Anderson et al. | | 715/503 |
| 6,828,990 B2 * | 12/2004 | Krolczyk et al. | | 715/777 |
| 2002/0133410 A1 * | 9/2002 | Hermreck et al. | | 705/19 |
| 2003/0222916 A1 * | 12/2003 | Kuwata et al. | | 345/777 |
| 2005/0235219 A1 * | 10/2005 | Szeto | | 715/788 |
| 2006/0026083 A1 * | 2/2006 | Wyle | | 705/31 |
| 2006/0059107 A1 * | 3/2006 | Elmore et al. | | 705/64 |
| 2006/0178961 A1 * | 8/2006 | Stanley et al. | | 705/31 |
| 2006/0230350 A1 * | 10/2006 | Baluja | | 715/700 |
| 2007/0033116 A1 * | 2/2007 | Murray | | 705/31 |
| 2007/0055945 A1 * | 3/2007 | Weber et al. | | 715/777 |
| 2007/0143701 A1 * | 6/2007 | Iremonger et al. | | 715/777 |
| 2007/0186175 A1 * | 8/2007 | Hudson | | 715/764 |
| 2007/0244775 A1 * | 10/2007 | Linder | | 705/35 |

OTHER PUBLICATIONS

A new approach to conceptual document indexing: building a hierarchical system of concepts based on document clusters Source; ACM International Conference Proceeding series; vol. 49; Dublin, Ireland;pp. 310-315, Year of Publication. 2003 by Trinity college Dublin; Author, Martin Holub charles University, Prague.*

* cited by examiner

*Primary Examiner*—William L Bashore
*Assistant Examiner*—Meseker Takele
(74) *Attorney, Agent, or Firm*—Osha • Liang LLP

(57) ABSTRACT

A method for displaying a user interface that includes displaying a plurality of tabs, wherein each of the plurality of tabs is associated with a selected item, receiving a selection of a first tab of the plurality of tabs, and displaying a selected page associated with the selected item based on the selection of the first tab, wherein the selected page and the plurality of tabs are visible on a single screen in the user interface, and wherein the selected item is selected from a plurality of items listed in a page of the user interface.

15 Claims, 9 Drawing Sheets

METHOD AND APPARATUS FOR DISPLAYING A USER INTERFACE ENABLING SELECTION AND INSTANT DISPLAY AND ACCESS OF PAGES

BACKGROUND

The typical computer system includes processor and memory. A variety of applications may execute on the computer system. The applications may be network applications, local applications, or a combination thereof. A network application is an application that is stored on another computer system from a network (e.g., office network, Internet, etc.). A local application is an application that is only stored and executed locally.

Each application has a logic component and a user interface. The logic component includes the instructions necessary to perform calculations and provide the functionality of the application. The user interface defines how a user interacts with the logic of the application.

For example, when accessing the Internet, an Internet browser application is often used. The user interacts with the user interface of the Internet browser. The user interface includes the buttons, menu of options, address bar, etc. When a user types an address in the address bar, the user interface communicates the address to the logic component. The logic component performs the necessary functions to retrieve the web page associated with the entered address and return the web page to the user interface. The user interface then displays the web page for the user.

Several types of user interfaces exist. One type of user interface is a graphical user interface. A graphical user interface includes graphical elements, such as windows, boxes, buttons, drop down menus, text using a variety of formatting, etc. By using a graphical user interface rather than other types of interfaces, a programmer is able to display information for the user in a more user conscience format.

The graphical user interface is often limited by a projected screen size of the computer system of the average user. Specifically, in order to maintain the ease of use for the application, the user interface is constrained in text size and in the manner in which graphical elements are displayed. Accordingly, many application use scroll bars and separate windows for related groups of graphical elements.

For example, in many applications, a user may select items from a long list of items. Each selected item may be associated with a separate page containing group of graphical objects for the selected item. The separate pages are typically each displayed in a separate window. When a user wants to access the separate page, the current window is typically replaced by the window with the separate page.

Separating pages and using scroll bars in the user interface may lead to navigational confusion. Navigational confusion occurs when a user follows one link after another and does not understand which page the user is on with respect to other pages or how to return to a previous page. In order to prevent navigational confusion in the application, links to a main window and wizards may be used.

The main window specifies how a user may access other items. For example, in an Internet retail application, a user may access a series of pages with items. On each page may be a link to a shopping cart window containing all items a user has selected. From the shopping cart window, the user may click on an item in the shopping cart in order to view a page with information associated with the item (e.g., description of item, cost, etc.). When the user clicks on an item, the window with the shopping cart is replaced or a new window is created to display the page with information associated with the item. In order to view a different page associated with another item, the user returns to the shopping cart and repeats the process.

Another method for preventing a user from getting lost in an application is by using a wizard. In a wizard, a user initially selects multiple items. The wizard determines when pages associated with the multiple items will be viewed by the user. Accordingly, rather than actively obtaining pages, a user is passively guided through the different pages in a defined manner.

SUMMARY

In general, in one aspect, the invention relates to a method for displaying a user interface that includes displaying a plurality of tabs, wherein each of the plurality of tabs is associated with a selected item, receiving a selection of a first tab of the plurality of tabs, and displaying a selected page associated with the selected item based on the selection of the first tab, wherein the selected page and the plurality of tabs are visible on a single screen in the user interface, and wherein the selected item is selected from a plurality of items listed in a page of the user interface.

In general, in one aspect, the invention relates to a computer program product for displaying a user interface that includes computer readable program code comprising instructions for displaying a plurality of tabs, wherein each of the plurality of tabs is associated with a selected item, receiving a selection of a first tab of the plurality of tabs, and displaying a selected page associated with the selected item based on the selection of the first tab, wherein the selected page and the plurality of tabs are visible on a single screen in the user interface, and wherein the selected item is selected from a plurality of items listed in a page of the user interface.

In general, in one aspect, the invention relates to a computer system that includes a processor with for displaying a user interface that includes displaying a plurality of tabs, wherein each of the plurality of tabs is associated with a selected item, receiving a selection of a first tab of the plurality of tabs, and displaying a selected page associated with the selected item based on the selection of the first tab, wherein the selected page and the plurality of tabs are visible on a single screen in the user interface, and wherein the selected item is selected from a plurality of items listed in a page of the user interface, and a page repository for storing the selected page.

In general, in one aspect, the invention relates to a method for creating a first tab from a plurality of items in a user interface that includes displaying a list of the plurality of items on a page of the user interface, receiving a selection of an item of the plurality of items to obtain a selected item, and displaying the first tab for the selected item, wherein the first tab and the page are visible on a single screen in the user interface.

In general, in one aspect, the invention relates to a method for traversing a user interface that includes receiving a plurality of tabs, wherein each of the plurality of tabs is associated with a selected item, selecting a first tab of the plurality of tabs, and receiving a selected page associated with the selected item based on the selection of the first tab, wherein the selected page and the plurality of tabs are visible on a single screen in a page of the user interface, and wherein the selected item is selected from a plurality of items listed in the user interface.

Other aspects of the invention will be apparent from the following description and the appended claims.

BRIEF DESCRIPTION OF DRAWINGS

FIGS. 3A-3E show an example of a user interface in accordance with one or more embodiments of the invention.

DETAILED DESCRIPTION

Figure 1A:
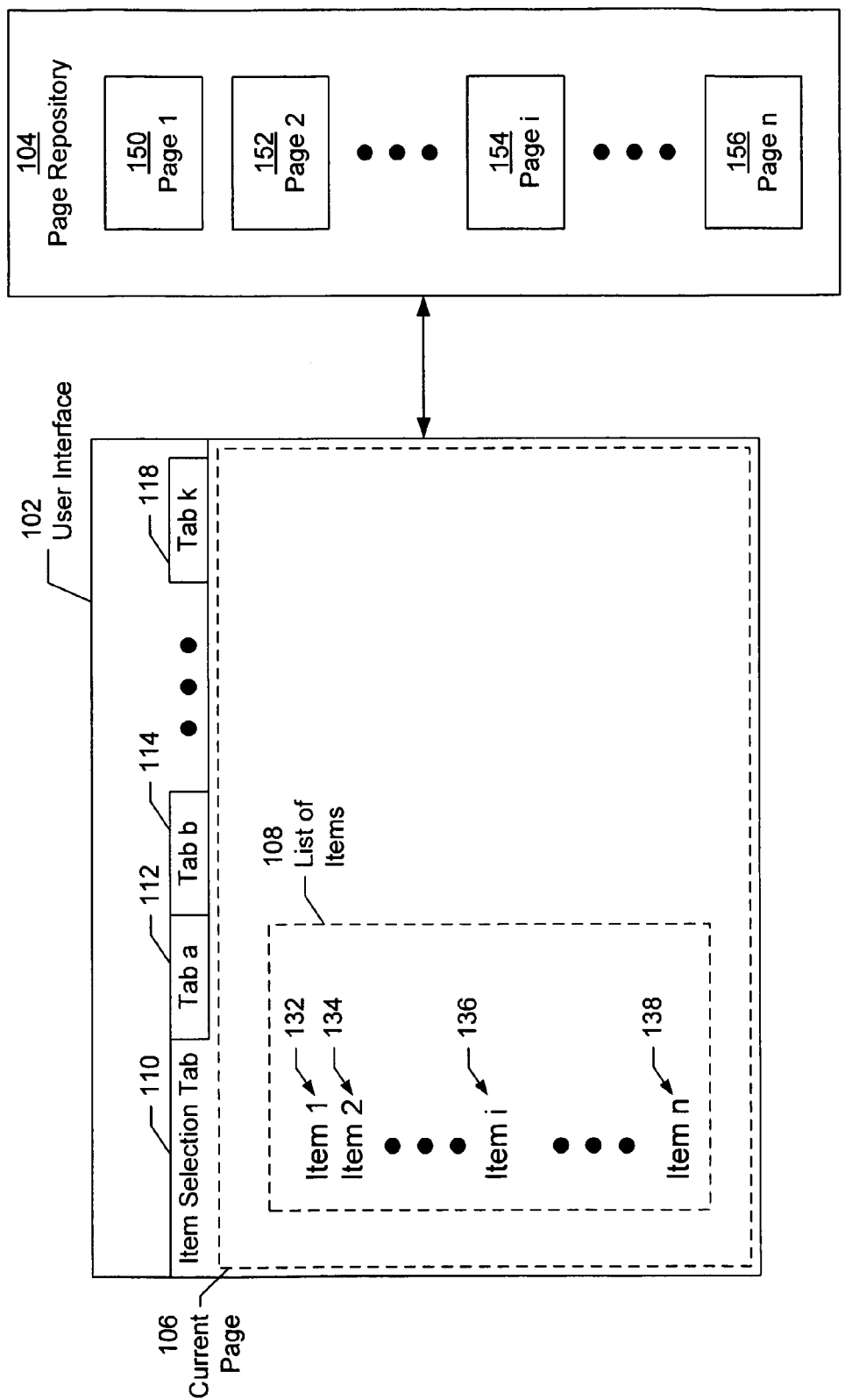
FIGS. 1A-1B shows a schematic diagram of a system for displaying a user interface in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for displaying a user interface that allows for selection and has tabs associated with selected items. Using the tabs, a user is able view the items that are selected, and traverse to a other tabs in the group of tabs. Further, embodiments of the invention combine the tabs and item selection into a single screen in the user interface allowing for navigational clarity. Specifically, by combining the viewability of tabs and item selection, a user is able to traverse pages and add new pages with a simple command.

The term "tab" or "tabs" as used herein should not be limited to the typical rectangular small box(es) (usually containing a text label or graphical icon) associated with a view pane of a user interface. The term should also be extended to graphical user interfaces that result in a similar effect, such as hyperlinks, listboxes, drop-down lists, buttons, and pull-down menus.

FIG. 1A shows a schematic diagram of a system for displaying a user interface in accordance with one or more embodiments of the invention. As shown in FIG. 1A, the system includes a user interface (102) and a page repository (104). Each of the aforementioned components is described below.

In one or more embodiments of the invention, the user interface (102) is a component of an application (not shown) that is visible to the user. The application is any type of code or executable for a computer system. The application may be a network application (i.e., an application that is stored and/or served from a network (e.g., Internet) or a local application (i.e., an application that is stored and/or served from the computer of the user).

Further, in one or more embodiments of the invention the application allows for user selection of several items. Specifically, the application may correspond to an application for entering data in a financial document (e.g., tax document, medical reimbursement form, etc.) that has multiple optional forms, a retail application that a user may choose from several items for sale and each item has an associated description, a music player, or any other type of application that allows user selection or other types of user input.

Continuing with FIG. 1A, because the user interface (102) is the visible component of the application, the user interface (102) is displayed on a screen or other such device of the computer system (not shown) of the user. The computer system of the user may be any type of computing device (e.g., laptop computer, desktop computer, personal digital assistants, Global Positioning System (GPS) unit, music player, etc.). Accordingly, the user interface (102) may be designed for a large variation in screen sizes.

In one or more embodiments of the invention, included within the context of the user interface are a current page (106) and multiple tabs (e.g., item selection tab (110), tab a (112), tab b (114), tab k (118)). The current page (106) corresponds to the page displayed from the page repository (104) based on the currently selected tab. For example, as shown in FIG. 1A, the currently selected tab is the item selection tab (110). The item selection tab (110) corresponds to a tab for selecting items. Accordingly, the current page (106) displays a list of items (108). One skilled in the art will appreciate that form of the list may vary. For example the list may be textual, pictorial, or even graphical iconic in nature. Each item (e.g., item 1 (132), item 2 (134), item i (136), item n (138)) in the list of items (108) corresponds to an identifier (e.g., name, picture, etc.) of optional items (e.g., form, song, item for sale, etc.) that a user may select.

Accordingly, associated with each item (e.g., item 1 (132), item 2 (134), item i (136), item n (138)) is a selection mechanism (not shown). The selection mechanism may correspond to a checkbox, button, or any other mechanism that allows a user to select the associated item from the list of items. Further, those skilled in the art will appreciate that the item may itself be the selection mechanism. For example, a picture may correspond to a button. Another example involves using the words of the item itself as the selection mechanism. If the user cursor is over the words, that item's words turn into a hyperlink indicating that the words are clickable. If the user clicks the hyperlink, that item is selected and the user is immediately directed to the tab.

Associated with each selected item from list of items (108) is a tab (e.g., item selection tab (110), tab a (112), tab b (114), tab k (118)). Specifically, in one or more embodiments of the invention, only items that are selected in the list of items have a tab that is displayed. In one or more embodiments of the invention, a tab (e.g., item selection tab (110), tab a (112), tab b (114), tab k (118)) corresponds to a small parallelogram (e.g., box, trapezoid, etc.), oval, or other such visual indicator well known to those skilled in the art that is associated with an instantiated page (e.g., current page (106)) that may be displayed. Within the tab may be text, picture, or another such visible indicator that identifies the item.

When a tab is activated (e.g., by a command, such as mouse click, keyboard stroke, etc. on the tab), the instantiated page associated with the tab is displayed. Further, in one or more embodiments of the invention, the currently selected tab (e.g., item selection tab (110)) may be highlighted differently than the non-currently selected tab(s) (e.g., tab a (112), tab b (114), tab k (118)) (e.g., through color or size differentiation).

Those skilled in the art will appreciate that while FIG. 1A shows a certain configuration of tabs (e.g., item selection tab (110), tab a (112), tab b (114), tab k (118)) and the current page (106), the tabs (e.g., item selection tab (110), tab a (112), tab b (114), tab k (118)) and the current page (106) may be located virtually anywhere (e.g., right hand side, bottom, left hand side, top, middle, etc.) within the user interface (102). Further, those skilled in the art will appreciate that while FIG. 1A, shows only the current page (106) and the tabs (e.g., item selection tab (110), tab a (112), tab b (114), tab k (118)), the user interface (102) may include other components such as descriptive panes, menu bars, etc. that are not shown in FIG. 1A.

Continuing with FIG. 1A, connected to the user interface (102) is a page repository (104). The page repository (104) corresponds to a storage unit (e.g., file system, group of files, mapped mass storage device, etc.) for pages (e.g., page 1 (150), page 2 (152), page i (154), page n (156)). Those skilled in the art will appreciate that the page repository (104) may span multiple storage systems and/or computer systems.

In one or more embodiments of the invention, each page (e.g., page 1 (150), page 2 (152), page i (154), page n (156)) corresponds to an individual grouping of graphical elements (e.g., windows, boxes, buttons, drop down menus, text using a variety of formatting, etc.) to be displayed. Specifically, associated with each item (e.g., item 1 (132), item 2 (134), item i (136), item n (138)) in the list of items (108) is at least one page (e.g., page 1 (150), page 2 (152), page i (154), page n (156)) in the page repository (104).

A page (e.g., page 1 (150), page 2 (152), page i (154), page n (156)) may correspond to a form, a description, etc. for the item (e.g., item 1 (132), item 2 (134), item i (136), item n (138)). Further, a page (e.g., page 1 (150), page 2 (152), page i (154), page n (156)) may correspond to template, static page, or an instantiated page. A template is a page that describes a form to be entered by a user, a static page is a page that cannot be changed, and an instantiated page is a page that has been created from the template and stored in the page repository (104) for the user.

Figure 1B:
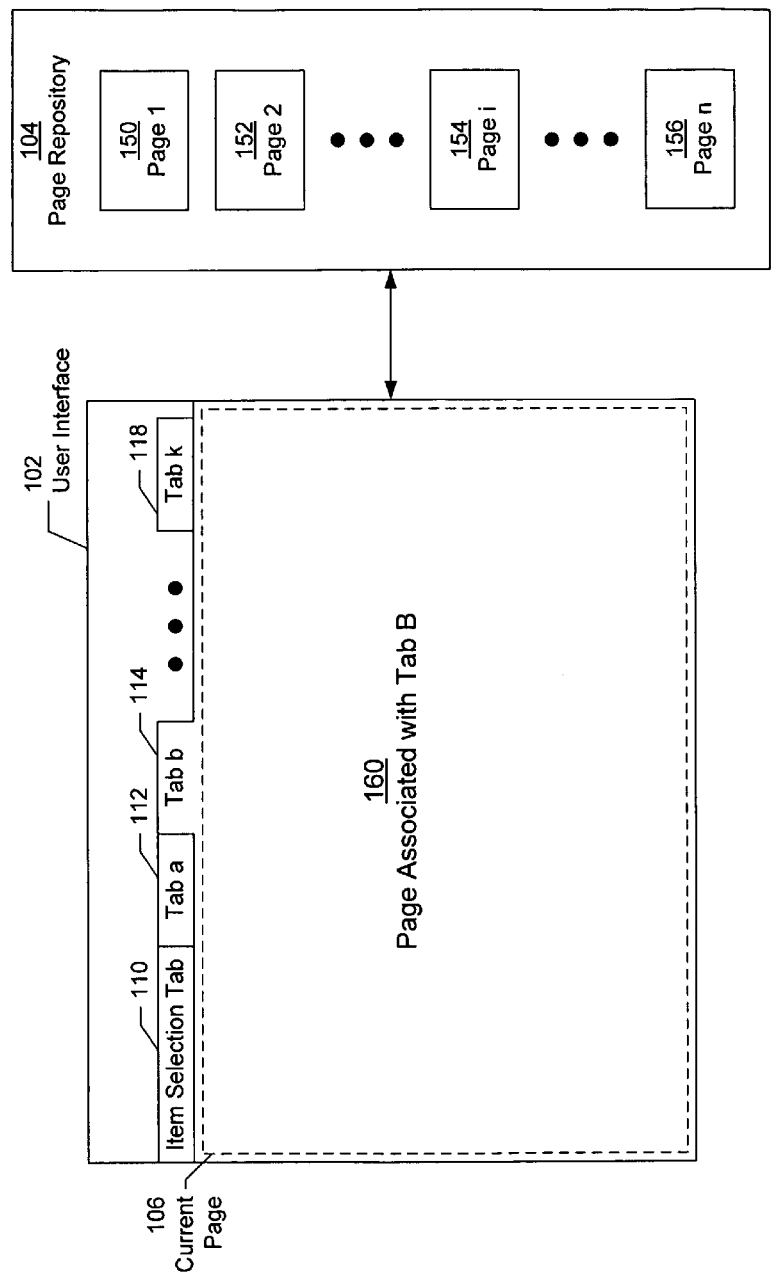

FIG. 1B shows a schematic diagram of a user interface when tab b (114) is selected in accordance with one or more embodiments of the invention. As shown in FIG. 1B, the current page (106) now displays the page associated with tab B (160). Further, the non-selected tabs (e.g., tab a (112), tab k (118)) associated with selected items and the item selection tab (110) are visible and available for selection on the user interface (102) even though the current page (106) associated with tab B (160) is displayed. In one or more embodiments of the invention, if the page associated with tab b (160) is large, a navigational control (not shown) may be added to the page associated with tab b (160) in order to allow a user to scroll through the page. One skilled in the art will appreciate that the navigational control may be a scroll bar or any other navigational controls (i.e., an arrow button that just shifts the page over, or an arrow that expands the page real estate area on the screen).

Those skilled in the art will appreciate that interposed between the user interface and the page repository may be a logic component (not shown) of the application. In one or more embodiments of the invention, the logic component includes functionality to access, process, and store pages.

Figure 2:
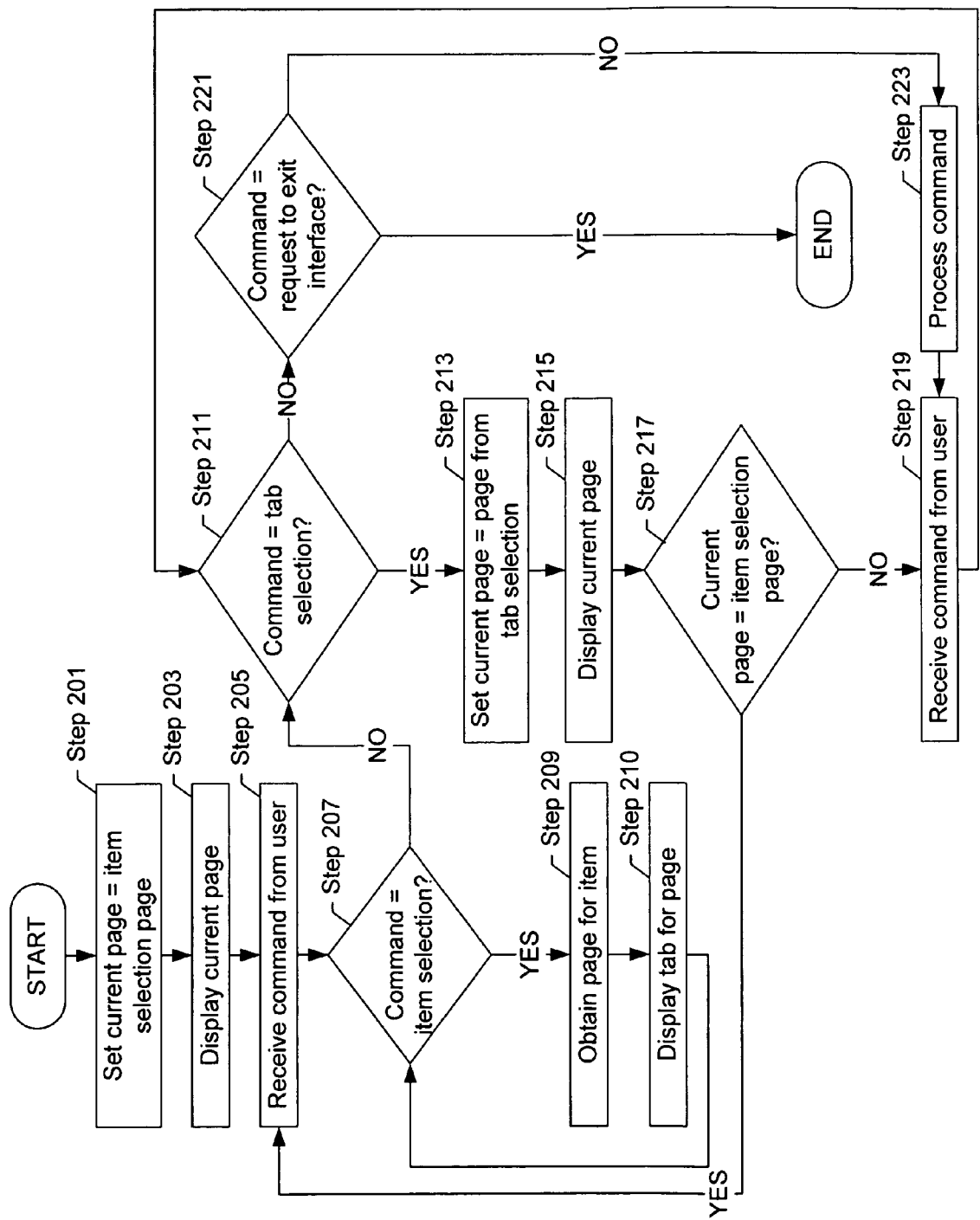
FIG. 2 shows a flowchart of a method for processing a user interface in accordance with one or more embodiments of the invention.

FIG. 2 shows a flowchart of a method for processing a user interface in accordance with one or more embodiments of the invention. Specifically, FIG. 2 shows a method of processing the user interface once a user has initiated execution of the application. Those skilled in the art will appreciate that pre-processing steps (e.g., processing commands to arrive at the described user interface) may also be performed.

Initially, the current page is set to the item selection page (Step 201). Accordingly, the activated tab is the item selection tab and the list of items is in the current page. The current page is then displayed (Step 203). Once the current page is displayed, a command from the user is received (Step 205). In one or more embodiments of the invention, the command from the user may be a mouse (or other pointing device) click or movement, stroke of the keyboard, voice command, or any other such command.

In one or more embodiments of the invention, after receiving the command, a determination is made whether the command is for an item selection (Step 207). Specifically, in one or more embodiments of the invention, item selection occurs when a user activates the selection mechanism (e.g., click on a checkbox) associated with an item. If the command is for item selection, then the page for the item is obtained (Step 209). The page for the item may be obtained by querying the page repository for the page. The page returned from the page repository may be an instantiated page, the template, or a static page. Those skilled in the art will appreciate that rather than obtaining the page at this stage, the page may be obtained only when the page is first viewed by the user and thereafter remain in a cached memory.

Next, the tab associated with the page is displayed in the user interface (Step 210). Specifically, in one or more embodiments of the invention, the tab is added to a group of preexisting tabs. In one or more embodiments of the invention, the position of the tab may be fixed according to the position of the selected item in the list or the order in which the selected item is selected.

Further, at this stage, if the selected item is the first item that is selected, then the grouping of tabs may be created and displayed to show the selected item tab and the item selection tab. Alternatively, if at this stage a large number of pre-existing tabs exist and span the user interface, then the pre-existing tabs may be decreased in size to make room for the selected item tab, or the selected item tab may be place on a new row. Further, a navigational control may be added to traverse the rows of tabs. One skilled in the art will appreciate that the navigational control may be a scroll bar or any other navigational controls (i.e., an arrow button that just shifts the tabs over, or an arrow that expands the tabs real estate area on the screen).

Additionally, in one or more embodiments of the invention, a user may decide to have multiple instantiations of the same item. For example, a user may desire to have multiple versions of the same form. Accordingly, if an item can have multiple instantiations, then another selection mechanism (e.g., box, field, etc.) may be added at this stage so that a user may choose the number of instantiations to have. For example, by using a selection mechanism to choose multiple instantiations of the same item, a user may select a certain number of the same retail item (e.g., five shirts of the same type).

Further, in one or more embodiments of the invention, interdependence may exist between items. Accordingly, if a user selects an item that is dependent on a precedent item, then the precedent item may also be automatically selected. Thus, a tab may be also automatically added for the page associated with the precedent item in accordance with one or more embodiments of the invention.

Continuing with FIG. 2, after displaying the tab associated with the page, then the user interface is ready for another command. Accordingly, next another command is received from the user (Step 205). Alternatively, if in Step 207, the command is not for an item selection, then a determination is made whether the command is for a tab selection (Step 211). In one or more embodiments of the invention, a tab selection occurs when a user requests that the user interface change the current page to the page associated with a particular tab. For example, a user may click on the tab using a mouse.

If the command is for a tab selection, then the current page is set as the page from the tab selection (Step 213). Next, the current page is displayed (Step 215). At this stage, if the current page has not been previously obtained, then the current page may be obtained before the current page is displayed. Further, those skilled in the art will appreciate that displaying the current page may also include displaying any text or other elements that a user has previously entered in the current page.

Once the current page is displayed, then a determination is made whether the current page is the item selection page (Step 217). If the current page is the item selection page, then the processing continues with receiving a command from the user in which the command may be to select an item (Step 205.

Alternatively, if the current page is not an item selection page, then another command is received from the user (Step 219). In one or more embodiments of the invention, the command that is received may be for tab selection, to exit the interface, to remove a tab, or to perform another task.

Accordingly, if in Step 211, a determination is made that the command is not for tab selection, then a determination is made whether the command is a request to exit the user interface (Step 221). A command to exit the user interface may be to close the application, go to a different interface within the application, such as a different type of user interface or a different instantiation of the currently described user interface. Accordingly, the user interface stops executing until a command is received to restart execution of the interface.

Alternatively, if the command is not to exit the user interface, then the command is for the current page in accordance with one or more embodiments of the invention. Accordingly, the command is processed according to the current page. After processing the command, then another command may be received (Step 219).

While not shown in FIG. 2, in accordance with one or more embodiments of the invention, items may be deselected from the selection page. When a user deselects an item, in one or more embodiments of the invention, the item is shown as deselected and the tab associated with the item is removed. In one or more embodiments of the invention, removal of the tab may be also be performed by selecting the intended tab and choosing an option to remove the tab. Alternatively, the user interface or application may determine whether the user has already modified the page associated with the item (e.g., by entering data). If the user has modified the page associated with the item, then extra precaution (e.g., requesting the user perform more than a single command) may be taken before deleting the page, deselecting the item, and removing the tab.

As shown in FIG. 2, by sending a single command to the user interface, a user is able to navigate to virtually any page. Further, the user may easily add pages and navigate to the added pages as well. Because the item selection tab is easy to find and the tabs are used, navigational confusion may be successfully avoided.

One type of application that typically leads users to navigational confusion is an application associated with a financial document. For example, in an application for tax filing, a user must often enter data from multiple different source forms according to the user's circumstances. Embodiments of the invention may be used to ease creating and entering data from the source forms. FIGS. 3A-3E show an example of a user interface for entering data in tax preparation forms in accordance with one or more embodiments of the invention.

For the aforementioned example, consider the case in which a user is using a tax application as described in the title bar (300). Accordingly, the user interface for the application may include components such as one or more menu bars (306), information about forms and answers to common questions (308), a separate pane for the application to make suggestions to the user (310), and an ability to select the type of form in which a user desires to enter data (312). For the aforementioned example, consider the case in which a user desires to create an income form (as shown highlighted in the 312). Specifically, the user desires to create a 1040 form to file with the Internal Revenue Service (IRS) using the application.

Figure 3A:
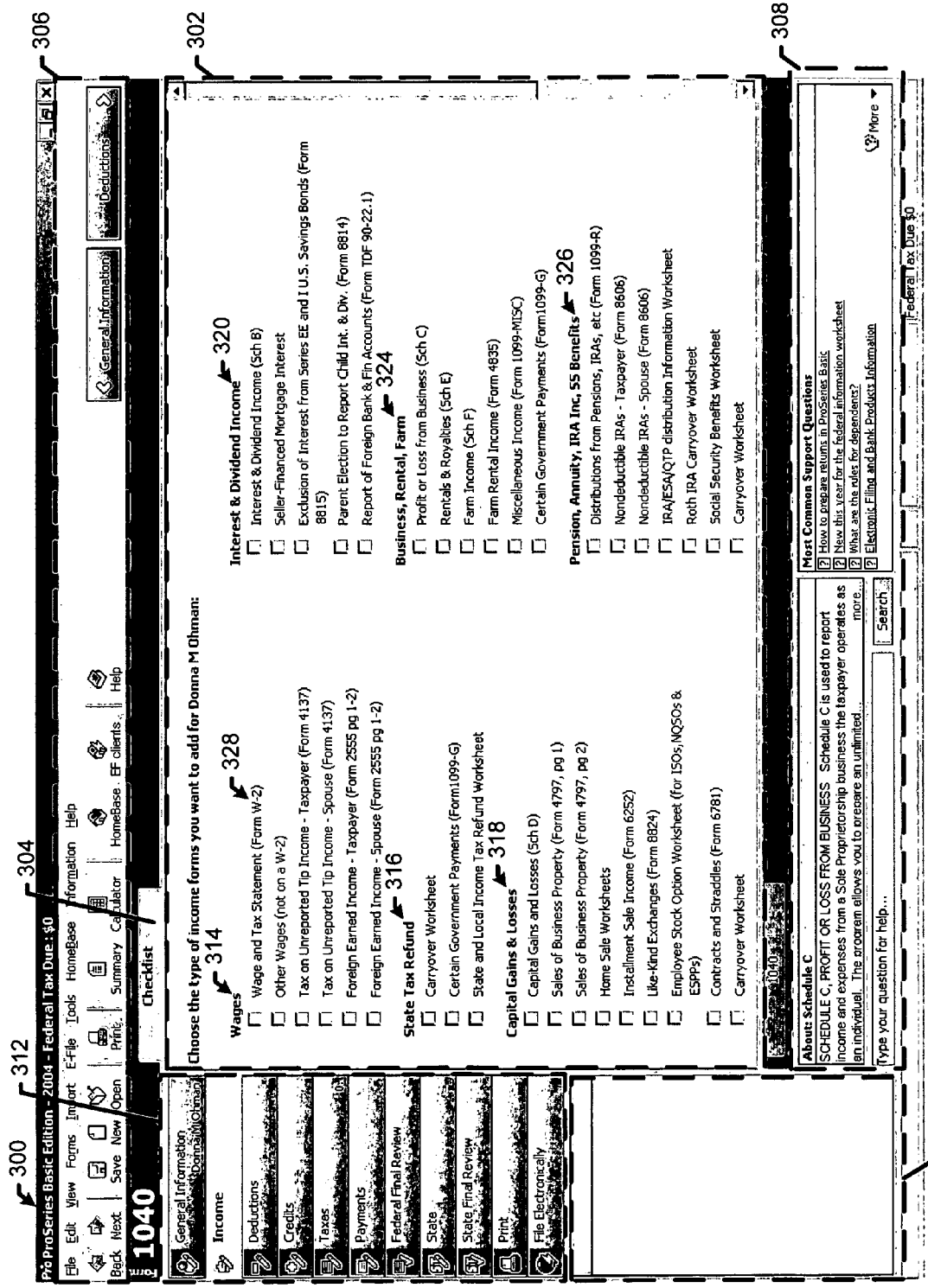

FIG. 3A shows an example user interface for a user to select the forms to complete a 1040 form. As shown in FIG. 3A, the current page (302) is an item selection page. Specifically, the item selection tab (e.g., checklist (304)) is highlighted. The item selection page includes a list of items related to income forms. In one or more embodiments of the invention, the list of items is divided into categories (e.g., wages (314), state tax refund (316), capital gains and losses (318), interest and dividend income (320), business, retail, and farm (324), pension, annuity, IRA Inc, and social security benefits (326), etc.). By dividing the items into categories, a user is able to easily select an item by finding a category. In the example, each item in the list corresponds to a source form.

Figure 3B:
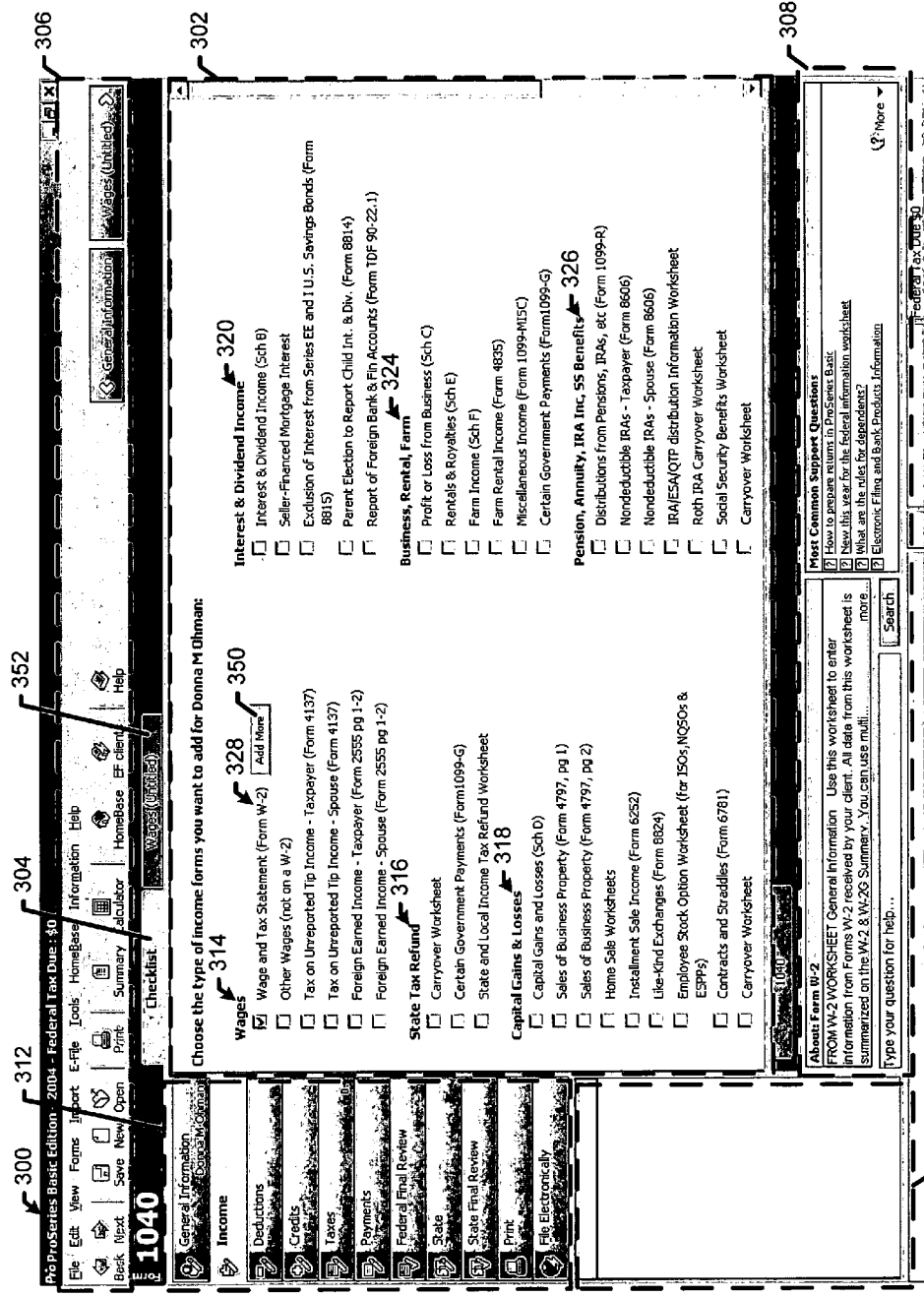

FIG. 3B shows an example user interface when a user has selected an item in accordance with one or more embodiments of the invention. Specifically, as shown in FIG. 3B, the selected item is a wage and tax statement (Form W-2) (328). Accordingly, as shown in FIG. 3B, a tab (e.g., Wages (Untitled) (352)) is added to represent the wages and tax statement form. Further, as shown in the example FIG. 3B, another selection mechanism (e.g., "Add More" button (350)) is added next to the selected item because a user may require multiple W-2 forms.

Figure 3C:
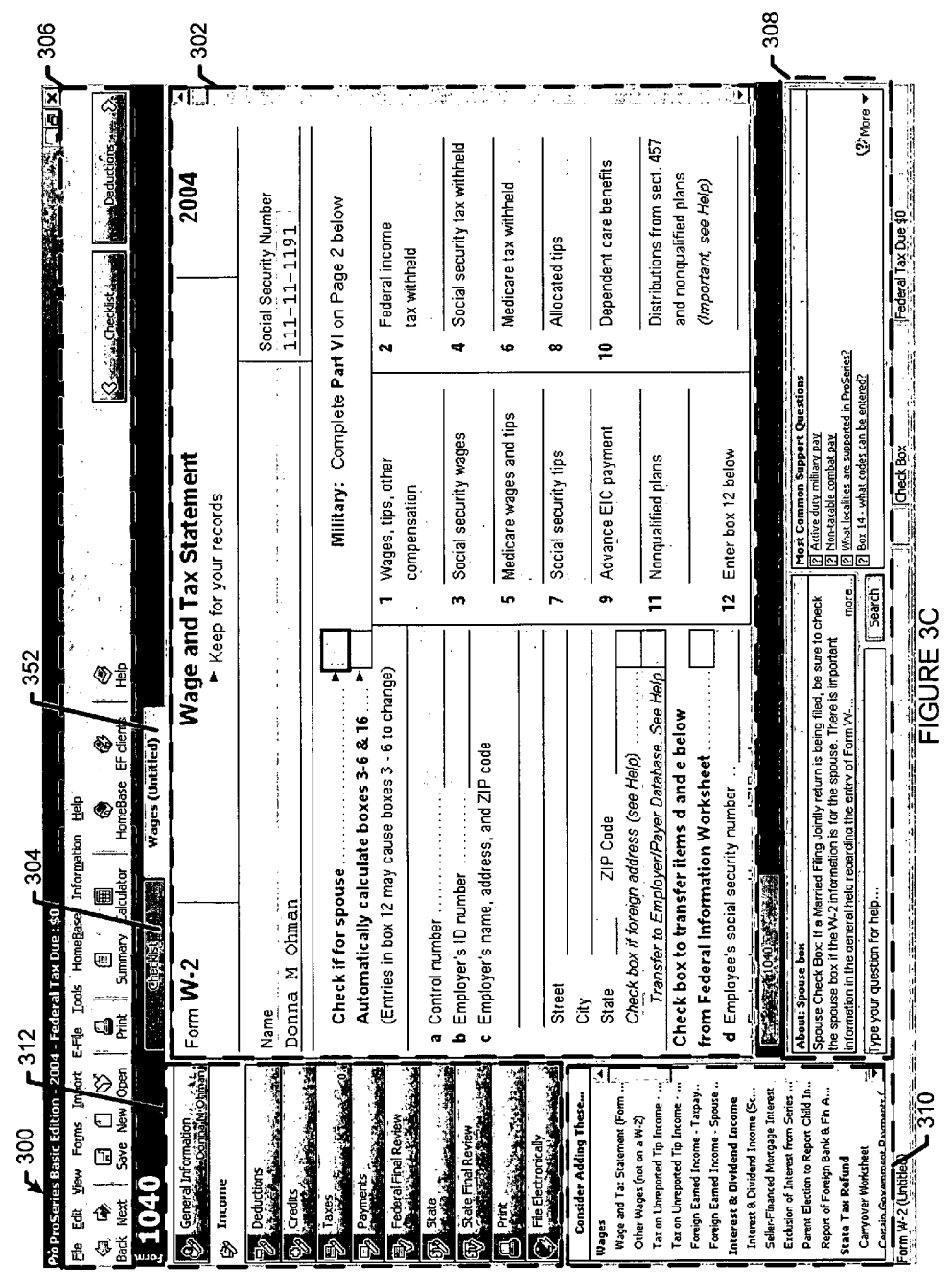

Suppose that the user next desires to enter data into the W-2 form. Accordingly, in one or more embodiments of the invention, the user may click on the Wages (Untitled) tab (352). FIG. 3C shows an example of the user interface when a user clicks on the Wages (Untitled) tab (352). As shown in FIG. 3C, the current page (302) is changed to show an instantiated copy of the Form W-2. User specific data (e.g., name and social security number) may be added to the instantiated copy of the W-2 form when the form is loaded. Once the form is displayed, a user may enter data into the Form W-2, as shown in FIG. 3D, in accordance with one or more embodiments of the invention.

Figure 3D:
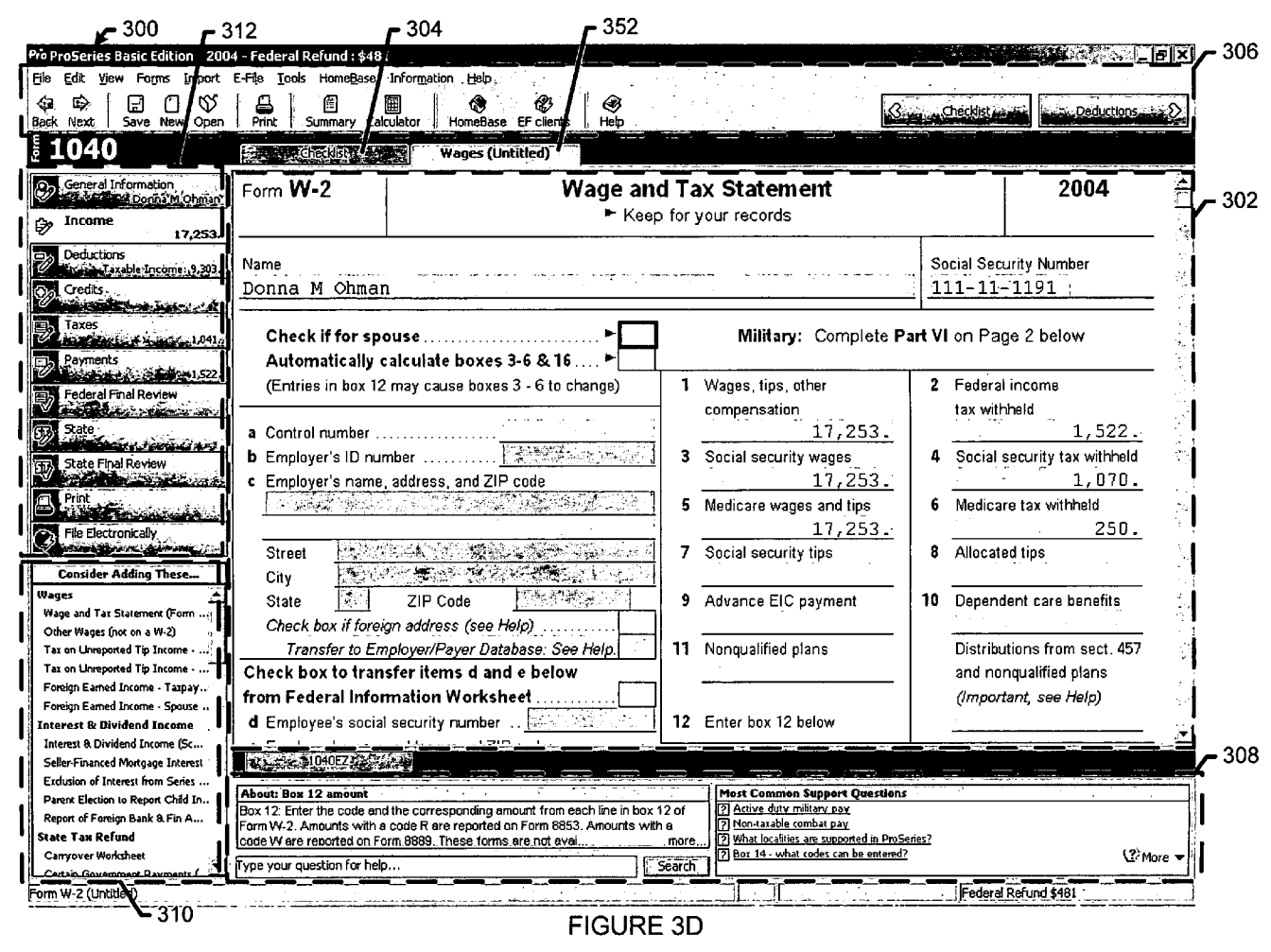

As shown in FIG. 3D, a user enters data into line 1-6 of the W-2 form. If at any stage the user desires to add additional forms, the user may return to the item selection tab (e.g., checklist (304)) and the data that the user entered in the Form W-2 remains, as shown in FIG. 3E.

Figure 3E:
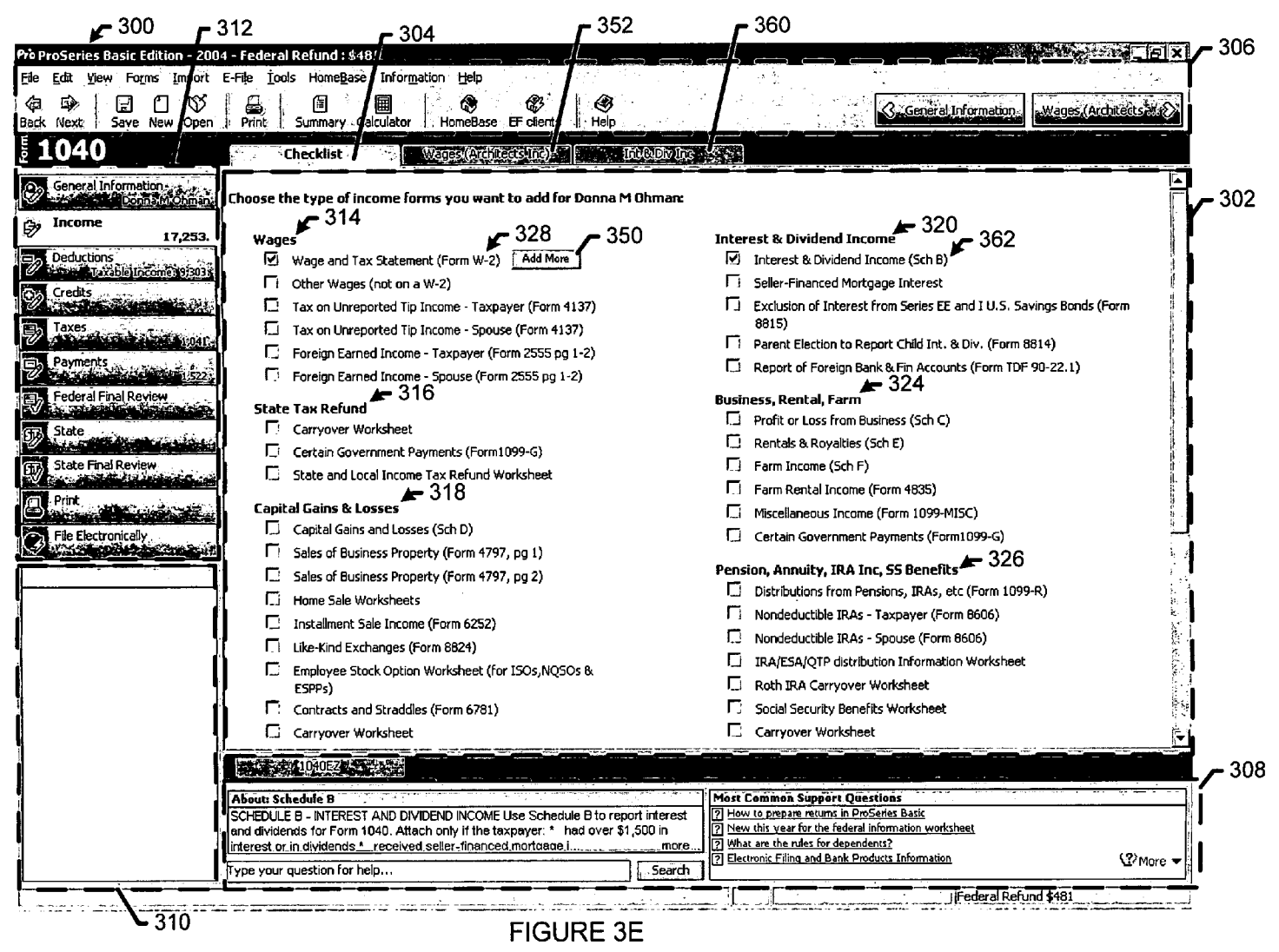

FIG. 3E shows an example in which a user returns to the item selection page and selects the interest and dividend (Schedule (Sch) B) (362). Accordingly, the tab (e.g., Int & Div Inc (360)) associated with the selected item (e.g., interest and dividend (Schedule (Sch) B) (362)) is added to the group of tabs. As shown in the aforementioned example, using the user interface, a user is able to easily traverse the different forms and fill in the forms in an order specified by the user.

Figure 4:
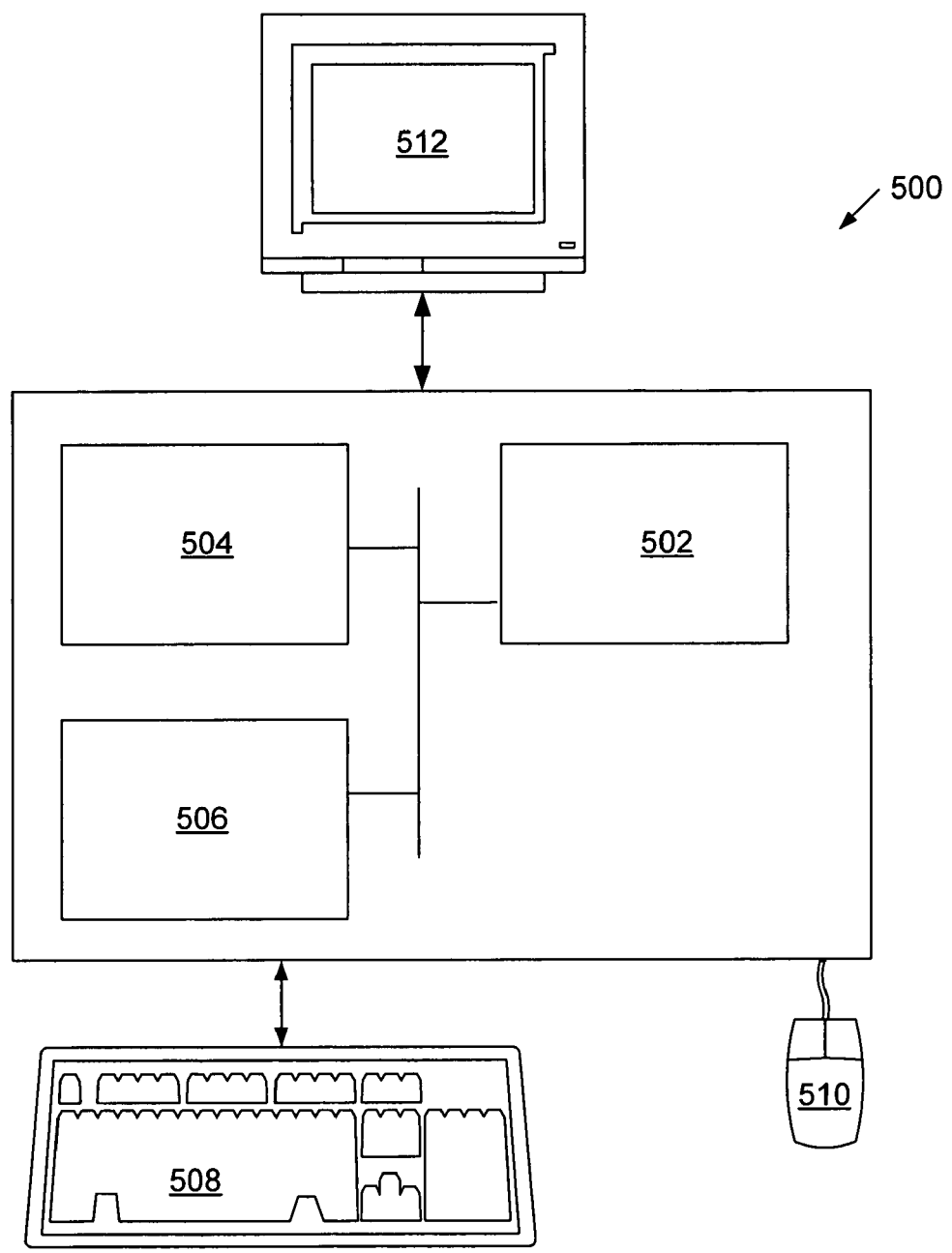
FIG. 4 shows a computer system in accordance with one embodiment of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., user interface, page repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism whereby a user is able to easily traverse a variety of pages associated with different user selected items. Specifically, with a single selection from a list of items, a new tab may be created.

Further, embodiments of the invention are able to reduce navigational complexity. Specifically, once tabs are displayed, a user is able to traverse the different pages associated with the tabs and the items. More specifically, a user may start by viewing a page displaying list of items, view a different page, and easily return to the page displaying the list of items without losing any data or causing confusion. Accordingly, the user is able to achieve navigational clarity when viewing pages where each page is associated with an different item.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying a user interface for a tax preparation application comprising:
   displaying a plurality of categories relevant to the tax preparation application,
      wherein each of the plurality of categories is associated with a type of tax form,
      wherein each of the plurality of categories comprise a list of selectable tax forms, and
      wherein each tax form of the list of selectable tax forms are furnished by a tax authority for filing with the tax authority;
   receiving a tax form selection from the list of selectable tax forms;
   generating, automatically and in response to the tax form selection, a tab based on the tax form selection, wherein the tab is generated contemporaneously within a same window of the tax preparation application in use;
   receiving a tab selection from a plurality of tabs;
   displaying a page associated with the tab selection,
      wherein the page and the plurality of tabs are visible on a single screen in the user interface,
      wherein the page comprises a tax form comprising fillable fields, and
      wherein the plurality of tabs allow for navigation between the pages associated with the tabs without returning to a central page of the user interface; and
   obtaining a value to fill the fillable fields corresponding to the tax form selection.

2. The method of claim 1, further comprising:
   determining a precedent tax form from the plurality of tax forms, wherein the tax form selection is dependent on the precedent tax form; and
   displaying a tab from the plurality of tabs for the precedent tax form.

3. The method of claim 1, further comprising:
   displaying a selection mechanism upon receiving the tax form selection;
   receiving input into the selection mechanism; and
   displaying a tab from the plurality of tabs for a selected tax form based on input.

4. The method of claim 1, further comprising:
   determining whether the plurality of tabs exceed a pre-defined span within the user interface; and
   adding a navigational control to view each of the plurality of tabs within the user interface when the plurality of tabs exceeds the pre-defined span within the user interface.

5. The method of claim 1, further comprising:
   displaying a selection mechanism on the user interface, wherein the selection mechanism allows the user to select multiple instantiations of a selected tax form.

6. A computer readable storage medium, comprising computer readable code for displaying a user interface for a financial software application, the computer readable code comprising instructions to:
   display a plurality of categories relevant to the tax preparation application,
      wherein each of the plurality of categories is associated with a type of tax form,
      wherein each of the plurality of categories comprise a list of selectable tax forms, and
      wherein each tax form of the list of selectable tax forms are furnished by a tax authority for filing with the tax authority;
   receive a tax form selection from the list of selectable tax forms;
   generate, automatically and in response to the tax form selection, a tab based on the tax form selection, wherein the tab is generated contemporaneously within a same window of the tax preparation application in use;
   receive a tab selection from a plurality of tabs;
   display a page associated with the tab selection,
      wherein the page and the plurality of tabs are visible on a single screen in the user interface,
      wherein the page comprises a tax form comprising fillable fields, and
      wherein the plurality of tabs allow for navigation between the pages associated with the tabs without returning to a central page of the user interface; and
   obtain a value to fill the fillable fields corresponding to the tax form selection.

7. The computer readable medium of claim 6, further comprising instructions to:
   determine a precedent tax form from the plurality of tax forms, wherein the tax form selection is dependent on the precedent tax form; and
   display a tab of the plurality of tabs for the precedent tax form.

8. The computer readable medium of claim 6, further comprising instructions to:
   display a selection mechanism upon receiving the tax form selection;
   receive input into the selection mechanism; and
   display a tab of the plurality of tabs for a selected tax form based on input.

9. The computer readable medium of claim 6, further comprising instructions to:
 determine whether the plurality of tabs exceed a pre-defined span within the user interface; and
 add a navigational control to view each of the plurality of tabs within the user interface when the plurality of tabs exceed the pre-defined span within the user interface.

10. The computer program product of claim 6, wherein the computer readable program code further comprises instructions for:
 displaying a selection mechanism on the user interface, wherein the selection mechanism allows the user to select multiple instantiations of a selected tax form.

11. A computer system comprising:
 a processor with associated memory for displaying a user interface for a tax preparation application comprising:
  displaying a plurality of categories relevant to the tax preparation application,
   wherein each of the plurality of categories is associated with a type of tax form,
   wherein each of the plurality of categories comprise a list of selectable tax forms, and
   wherein each tax form of the list of selectable tax forms are furnished by a tax authority for filing with the tax authority;
  receiving a tax form selection from the list of selectable tax forms;
  generating, automatically and in response to the tax form selection, a tab based on the tax form selection, wherein the tab is generated contemporaneously within a same window of the tax preparation application in use;
  receiving a tab selection from a plurality of tabs;
  displaying a page associated with the tab selection,
   wherein the page and the plurality of tabs are visible on a single screen in the user interface,
   wherein the page comprises a tax form comprising fillable fields, and
   wherein the plurality of tabs allow for navigation between the pages associated with the tabs without returning to a central page of the user interface;
  obtaining a value to fill the fillable fields corresponding to the tax form selection; and
 a page repository for storing the page.

12. The computer system of claim 11, further comprising:
 determining a precedent tax form from the plurality of tax forms, wherein the tax form selection is dependent on the precedent tax form; and
 displaying a tab of the plurality of tabs for the precedent tax form.

13. The computer system of claim 11, wherein creating the plurality of tabs further comprises:
 displaying a selection mechanism upon receiving the tax form selection;
 receiving input into the selection mechanism; and
 displaying a tab of the plurality of tabs for a selected tax form based on input.

14. The computer system of claim 11, wherein creating the plurality of tabs further comprises:
 determining whether the plurality of tabs exceed a pre-defined span within the user interface; and
 adding a navigational control to view each of the plurality of tabs within the user interface when the plurality of tabs exceed the pre-defined span within the user interface.

15. The computer system of claim 11, wherein displaying the user interface further comprises:
 displaying a selection mechanism on the user interface, wherein the selection mechanism allows the user to select multiple instantiations of a selected tax form.

* * * * *